(12) United States Patent
Kurihara

(10) Patent No.: US 8,033,171 B2
(45) Date of Patent: Oct. 11, 2011

(54) DETECTION APPARATUS, DETECTION METHOD, AND ELECTRONIC APPARATUS

(75) Inventor: Kazuo Kurihara, Miyagi (JP)

(73) Assignee: Sony Corporation, Tokyo (JP)

( * ) Notice: Subject to any disclaimer, the term of this patent is extended or adjusted under 35 U.S.C. 154(b) by 723 days.

(21) Appl. No.: 12/117,564

(22) Filed: May 8, 2008

(65) Prior Publication Data

US 2008/0282800 A1 Nov. 20, 2008

(30) Foreign Application Priority Data

May 16, 2007 (JP) ................................. 2007-130689

(51) Int. Cl.
*G01P 9/04* (2006.01)

(52) U.S. Cl. .................................. 73/504.12; 73/504.15

(58) Field of Classification Search ............... 73/504.12, 73/504.15, 504.16, 504.04, 504.02
See application file for complete search history.

(56) References Cited

U.S. PATENT DOCUMENTS

| | | | | |
|---|---|---|---|---|
| 5,794,080 | A * | 8/1998 | Watanabe et al. ............... | 396/53 |
| 6,116,086 | A * | 9/2000 | Fujimoto .................... | 73/504.14 |
| 6,564,638 | B1 | 5/2003 | Ebara | |
| 6,584,842 | B2 * | 7/2003 | Fujimoto et al. ........... | 73/504.12 |
| 6,608,425 | B2 * | 8/2003 | Ebara et al. ............... | 310/316.01 |
| 7,111,512 | B2 * | 9/2006 | Matsunaga et al. ......... | 73/504.12 |
| 7,263,884 | B2 * | 9/2007 | Takahashi et al. .......... | 73/504.15 |
| 7,325,452 | B2 * | 2/2008 | Takahashi et al. .......... | 73/504.15 |
| 7,665,360 | B2 * | 2/2010 | Kurihara .................... | 73/504.12 |
| 2005/0115318 | A1 * | 6/2005 | Kawamura et al. ......... | 73/504.12 |
| 2005/0241395 | A1 * | 11/2005 | Takahashi et al. .......... | 73/504.15 |

FOREIGN PATENT DOCUMENTS

JP 2000-205861 7/2000

* cited by examiner

*Primary Examiner* — Helen C. Kwok
(74) *Attorney, Agent, or Firm* — K&L Gates LLP

(57) ABSTRACT

A detection apparatus is provided which includes a cantilever vibration gyro including a piezoelectric element having a first side provided with a drive electrode and a pair of detection electrodes sandwiching the drive electrode with predetermined gaps therebetween and a second side opposed to the first side and provided with a common electrode, which vibrates by a drive signal input between the drive electrode and the common electrode and generates a pair of detected signals corresponding to Coriolis force from the detection electrodes. The detection apparatus also includes a bias applying section for applying a bias voltage to the detection electrodes, an adding section adding the pair of detected signals, a first phase delay section delaying a phase of the detected signal obtained by the addition by a range larger than 45° and smaller than 90°, and an amplitude control section controlling the delayed detected signal to a predetermined voltage amplitude to output as the drive signal.

10 Claims, 15 Drawing Sheets

DETECTION APPARATUS, DETECTION METHOD, AND ELECTRONIC APPARATUS

CROSS REFERENCES TO RELATED APPLICATIONS

The present application claims priority to Japanese Patent Application JP 2007-130689 filed in the Japanese Patent Office on May 16, 2007, the entire contents of which is being incorporated herein by reference.

BACKGROUND

The present invention relates to a detection apparatus and method used for detecting an angular velocity of an object, and to an electronic apparatus equipped with the detection apparatus.

Up to now, so-called gyro detection apparatuses have been widely used as angular velocity sensors for consumer use. The gyro detection apparatuses are sensors that detect angular velocities by allowing a cantilever vibrator to vibrate at a predetermined resonance frequency and detecting Coriolis force generated due to an influence of the angular velocity by a piezoelectric element or the like.

The gyro detection apparatuses have advantages in that the sensors have a simple mechanism, require short time to activate, and can be manufactured at low costs. The gyro detection apparatuses are mounted to, for example, electronic apparatuses such as a video camera, a virtual reality apparatus, and a car navigation system, and are used as sensors in shake detection, motion detection, and direction detection, respectively.

In recent years, the gyro detection apparatuses are required to be downsized and improved in performance due to the downsizing and improvement in performance of the electronic apparatuses to which the gyro detection apparatuses are mounted. For example, because of multi-functionalization of the electronic apparatuses, demands are made to mount the gyro detection apparatus to a substrate in combination with various sensors for other purposes, thereby reducing a size thereof. A generally-used technique for realizing such reduction in size is called MEMS (Micro Electro Mechanical System) which involves using an Si substrate and forming a structural body using a thin-film process and a photolithography technique used in forming semiconductors.

Incidentally, a vibration system becomes light along with the downsizing of the gyro detection apparatus. However, because the Coriolis force is proportional to the weight of the vibration system, detection sensitivity deteriorates that much. Further, because amplitude of the vibrator becomes small when a power supply voltage is decreased due to the downsizing of the gyro detection apparatus, the detection sensitivity also deteriorates thereby. An S/N of a detection output signal is degraded by the deterioration of the detection sensitivity.

Thus, to solve the problems as described above, there is disclosed a technique in which drive signals having the same phase and amplitude and output from two detection electrodes are added in an adding circuit and the signal whose phase has been inverted in an inversion circuit is input to the two detection electrodes (see, for example, Japanese Patent Application Laid-open No. 2000-205861 (paragraphs (0005) and (0016), and FIG. 1)).

However, recently, further downsizing and reduction in voltage of a vibration gyro are required. Therefore, there is a need to further improve detection sensitivity of the vibration gyro and a need for suppressing noises to obtain a higher S/N than ever before.

SUMMARY

In view of the above-mentioned circumstances, there is a need for a detection apparatus and method capable of stabilizing self-oscillation of a vibration gyro to suppress noises and realize a high S/N, and an electronic apparatus equipped with the detection apparatus.

According to an embodiment, there is provided a detection apparatus including a cantilever vibration gyro, bias applying means, adding means, a first phase delaying means, and amplitude controlling means. The cantilever vibration gyro includes a piezoelectric element which has a first side and a second side, the first side provided with a drive electrode and a pair of detection electrodes, the drive electrode disposed between the pair of detection electrodes with predetermined gaps, the second side opposed to the first side and provided with a common electrode. The cantilever vibration gyro vibrates by a drive signal input between the drive electrode and the common electrode and generates a pair of detected signals corresponding to Coriolis force from the pair of detection electrodes. The bias applying means applies a bias voltage to the pair of detection electrodes. The adding means adds the pair of detected signals. The first phase delaying means delays a phase of the detected signal added by the adding means by a range larger than 45° and smaller than 90°. The amplitude controlling means controls the detected signal delayed by the first phase delaying means to a predetermined voltage amplitude and outputs the detected signal as the drive signal.

According to the findings of the inventors of the present invention, in the thus structured vibration gyro, a parasitic capacitance is generated between the drive electrode and the pair of detection electrodes. An input/output phase difference of the parasitic capacitance is substantially 0°, and a component of the parasitic capacitance is thus affecting the original phase difference of 90° between the drive electrode and the pair of detection electrodes. Thus, in the embodiment of the present invention, by delaying the phase of the detected signal by the range larger than 45° and smaller than 90°, the phase is compensated for the amount of the parasitic capacitance. Accordingly, self-oscillation of the vibration gyro is made stable, resulting in suppression of noises and a high S/N.

The detection apparatus may further include differential amplifier means, a second phase delaying means, and synchronous detecting means. The differential amplifier means differential-amplifies the pair of detected signals. The second phase delaying means delays the phase of the detected signal added by the adding means by 90°. The synchronous detecting means synchronously detects the signal differential-amplified by the differential amplifier means based on the detected signal delayed by the second phase delaying means. Accordingly, detection sensitivity can be improved.

The first phase delaying means desirably delays the phase of the detected signal added by the adding means by 75°. This is an optimal numerical value obtained by the experiment conducted based on the findings of the inventors of the present invention.

The vibration gyro is desirably caused to self-oscillate at a frequency higher than a resonance frequency of the vibration gyro. Accordingly, self-oscillation of the vibration gyro is made more stable, resulting in suppression of noises and a high S/N.

According to another embodiment, there is provided a detection apparatus including a cantilever vibration gyro, bias applying means, adding means, a first phase delaying means, amplitude controlling means, differential amplifier means, a second phase delaying means, and synchronous detecting means. The cantilever vibration gyro includes a piezoelectric element which has a first side and a second side, the first side provided with a drive electrode and a pair of detection electrodes, the drive electrode disposed between the pair of detection electrodes with predetermined gaps, the second side opposed to the first side and provided with a common electrode. The cantilever vibration gyro vibrates by a drive signal input between the drive electrode and the common electrode and generates a pair of detected signals corresponding to Coriolis force from the pair of detection electrodes. The bias applying means applies a bias voltage to the pair of detection electrodes. The adding means adds the pair of detected signals. The first phase delaying means delays a phase of the detected signal added by the adding means by a first phase amount. The amplitude controlling means controls the detected signal delayed by the first phase delaying means to a predetermined voltage amplitude and outputs the detected signal as the drive signal. The differential amplifier means differential-amplifies the pair of detected signals. The second phase delaying means delays the phase of the detected signal added by the adding means by a second phase amount different from the first phase amount. The synchronous detecting means synchronously detects the signal differential-amplified by the differential amplifier means based on the detected signal delayed by the second phase delaying means.

According to the findings, a phase delay amount for self-oscillation and that for synchronous detection are set to different values. According to the embodiment, it becomes possible to compensate the phase for the amount of the parasitic capacitance. Thus, self-oscillation of the vibration gyro is made more stable, resulting in suppression of noises and a high S/N.

Desirably, the first phase amount is of the range larger than 45° and smaller than 90° and the second phase amount is 90°. More desirably, the first phase amount is 75° and the second phase amount is 90°. These are optimal numerical values obtained by the experiment conducted based on the findings of the inventors.

The vibration gyro is desirably caused to self-oscillate at a frequency higher than a resonance frequency of the vibration gyro. Accordingly, self-oscillation of the vibration gyro is made more stable, resulting in suppression of noises and a high S/N.

According to still another embodiment, there is provided a method of detecting an angular velocity using a cantilever vibration gyro. The cantilever vibration gyro includes a piezoelectric element which has a first side and a second side, the first side provided with a drive electrode and a pair of detection electrodes, the drive electrode disposed between the pair of detection electrodes with predetermined gaps, the second side opposed to the first side and provided with a common electrode. The cantilever vibration gyro vibrates by a drive signal input between the drive electrode and the common electrode and generates a pair of detected signals corresponding to Coriolis force from the pair of detection electrodes. The detection method includes applying a bias voltage to the pair of detection electrodes, adding the pair of detected signals, delaying a phase of the detected signal obtained through the addition by a range larger than 45° and smaller than 90°, and controlling the delayed detected signal to a predetermined voltage amplitude and outputting the detected signal as the drive signal.

In the embodiment, by delaying the phase of the detected signal by the range larger than 45° and smaller than 90°, the phase is compensated for the amount of the parasitic capacitance. Accordingly, self-oscillation of the vibration gyro is made more stable, resulting in suppression of noises and a high S/N.

It is desirable to differential-amplify the pair of detected signals, delay the phase of the detected signal obtained through the addition by 90°, and synchronously detect the differential-amplified signal based on the detected signal whose phase has been delayed by 90°. Accordingly, detection sensitivity can be improved.

The phase of the detected signal output as the drive signal is desirably delayed by 75°. This is an optimal numerical value obtained by the experiment conducted based on the findings of the inventors of the present invention.

The vibration gyro is desirably caused to self-oscillate at a frequency higher than a resonance frequency of the vibration gyro. Accordingly, self-oscillation of the vibration gyro is made more stable, resulting in suppression of noises and a high S/N.

According to yet another embodiment, there is provided a method of detecting an angular velocity using a cantilever vibration gyro. The cantilever vibration gyro includes a piezoelectric element which has a first side and a second side, the first side provided with a drive electrode and a pair of detection electrodes, the drive electrode disposed between the pair of detection electrodes with predetermined gaps, the second side opposed to the first side and provided with a common electrode. The cantilever vibration gyro vibrates by a drive signal input between the drive electrode and the common electrode and generates a pair of detected signals corresponding to Coriolis force from the pair of detection electrodes. The detection method includes applying a bias voltage to the pair of detection electrodes, adding the pair of detected signals, delaying a phase of the detected signal obtained through the addition by a first phase amount, controlling the detected signal delayed by the first phase amount to a predetermined voltage amplitude and outputting the detected signal as the drive signal, differential-amplifying the pair of detected signals, delaying the phase of the detected signal obtained through the addition by a second phase amount different from the first phase amount, and synchronously detecting the differential-amplified signal based on the detected signal delayed by the second phase amount.

Desirably, the first phase amount is of the range larger than 45° and smaller than 90° and the second phase amount is 90°. Accordingly, the phase is compensated for the amount of the parasitic capacitance and self-oscillation of the vibration gyro is made more stable, resulting in suppression of noises and a high S/N.

More desirably, the first phase amount is 75° and the second phase amount is 90°. These are optimal numerical values obtained by the experiment conducted based on the findings.

The vibration gyro is desirably caused to self-oscillate at a frequency higher than a resonance frequency of the vibration gyro. Accordingly, self-oscillation of the vibration gyro is made more stable, resulting in suppression of noises and a high S/N.

According to still another embodiment, there is provided an electronic apparatus including a detection apparatus and controlling means. The detection apparatus includes a cantilever vibration gyro, bias applying means, adding means, a first phase delaying means, amplitude controlling means, differential amplifier means, a second phase delaying means, and synchronous detecting means. The cantilever vibration gyro includes a piezoelectric element which has a first side and a second side, the first side provided with a drive electrode and a pair of detection electrodes, the drive electrode disposed between the pair of detection electrodes with predetermined gaps, the second side opposed to the first side and provided with a common electrode. The cantilever vibration gyro vibrates by a drive signal input between the drive electrode and the common electrode and generates a pair of detected signals corresponding to Coriolis force from the pair of detection electrodes. The bias applying means applies a bias voltage to the pair of detection electrodes. The adding means adds the pair of detected signals. The first phase delaying means delays a phase of the detected signal added by the adding means by a range larger than 45° and smaller than 90°. The amplitude controlling means controls the detected signal delayed by the first phase delaying means to a predetermined voltage amplitude and outputs the detected signal as the drive signal. The differential amplifier means differential-amplifies the pair of detected signals. The second phase delaying means delays the phase of the detected signal added by the adding means by 90°. The synchronous detecting means synchronously detects the signal differential-amplified by the differential amplifier means based on the detected signal delayed by the second phase delaying means. The controlling means performs predetermined control based on an output of the synchronous detecting means.

According to yet another embodiment, there is provided an electronic apparatus including a detection apparatus and controlling means. The detection apparatus includes a cantilever vibration gyro, bias applying means, adding means, a first phase delaying means, amplitude controlling means, differential amplifier means, a second phase delaying means, and synchronous detecting means. The cantilever vibration gyro includes a piezoelectric element which has a first side and a second side, the first side provided with a drive electrode and a pair of detection electrodes, the drive electrode disposed between the pair of detection electrodes with predetermined gaps, the second side opposed to the first side and provided with a common electrode. The cantilever vibration gyro vibrates by a drive signal input between the drive electrode and the common electrode and generates a pair of detected signals corresponding to Coriolis force from the pair of detection electrodes. The bias applying means applies a bias voltage to the pair of detection electrodes. The adding means adds the pair of detected signals. The first phase delaying means delays a phase of the detected signal added by the adding means by a first phase amount. The amplitude controlling means controls the detected signal delayed by the first phase delaying means to a predetermined voltage amplitude and outputs the detected signal as the drive signal. The differential amplifier means differential-amplifies the pair of detected signals. The second phase delaying means delays the phase of the detected signal added by the adding means by a second phase amount different from the first phase amount. The synchronous detecting means synchronously detects the signal differential-amplified by the differential amplifier means based on the detected signal delayed by the second phase delaying means. The controlling means performs predetermined control based on an output of the synchronous detecting means.

In the embodiment of the present invention, self-oscillation of the vibration gyro is made stable to thereby suppress noises and obtain a high S/N. Thus, the controlling means is capable of performing control more accurately.

Here, an example of the electronic apparatus is a digital cameral equipped with a shake correction mechanism, and the controlling means controls a correction amount of the shake correction mechanism. Accordingly, more accurate shake correction becomes possible.

As described above, according to the embodiments, self-oscillation of the vibration gyro is made stable to thereby suppress noises and obtain a high S/N.

Additional features and advantages are described herein, and will be apparent from the following Detailed Description and the figures.

DETAILED DESCRIPTION

Hereinafter, embodiments will be described with reference to the drawings.

Figure 1:
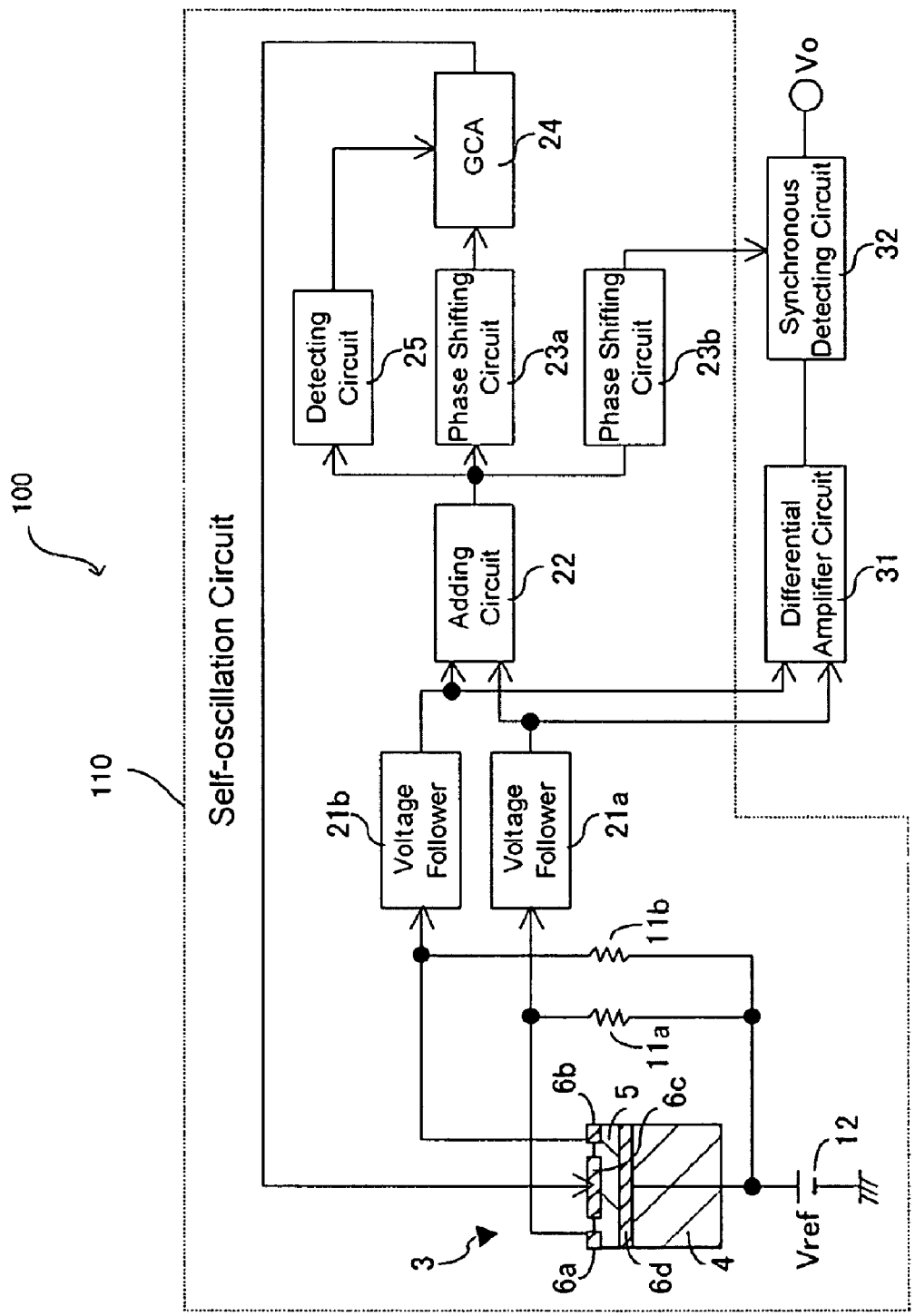
FIG. 1 is a circuit block diagram showing a structure of a gyro detection apparatus according to an embodiment.

FIG. 1 is a block diagram showing an example of a gyro detection apparatus according to an embodiment.

As shown in FIG. 1, a gyro detection apparatus 100 includes a vibration gyro 1, resistors 11*a* and 11*b*, a DC power supply 12 as bias applying means, voltage followers 21*a* and 21*b*, an adding circuit 22 as adding means, phase shifting circuits 23*a* and 23*b* as first and second phase delaying means, a GCA (Gain Control Amplifier) 24 and detecting circuit 25 as amplitude controlling means, a differential amplifier circuit 31 as differential amplifier means, and a synchronous detecting circuit 32 as synchronous detecting means.

In the gyro detection apparatus 100, the vibration gyro 1, the resistors 11*a* and 11*b*, the DC power supply 12, the voltage followers 21*a* and 21*b*, the adding circuit 22, the phase shifting circuits 23*a* and 23*b*, the GCA 24, and the detecting circuit 25 constitute a self-oscillation circuit 110.

Prior to describing an overall operation of the gyro detection apparatus 100, description will first be given on an example of the vibration gyro 1 and an operation principle thereof.

Figure 2:
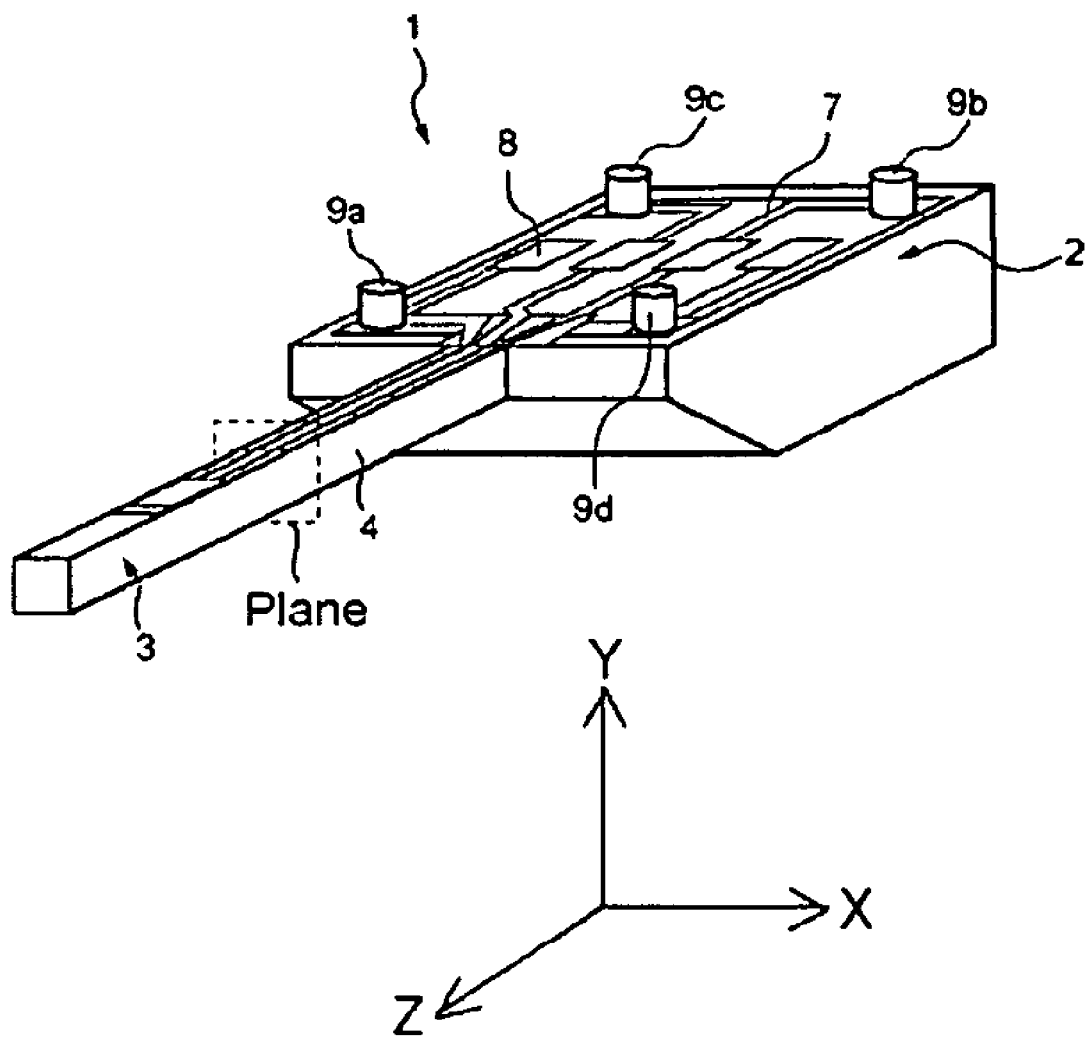
FIG. 2 is a perspective view showing an example of a vibration gyro shown in FIG. 1.

FIG. 2 is a perspective view showing the example of the vibration gyro 1.

Figure 3:
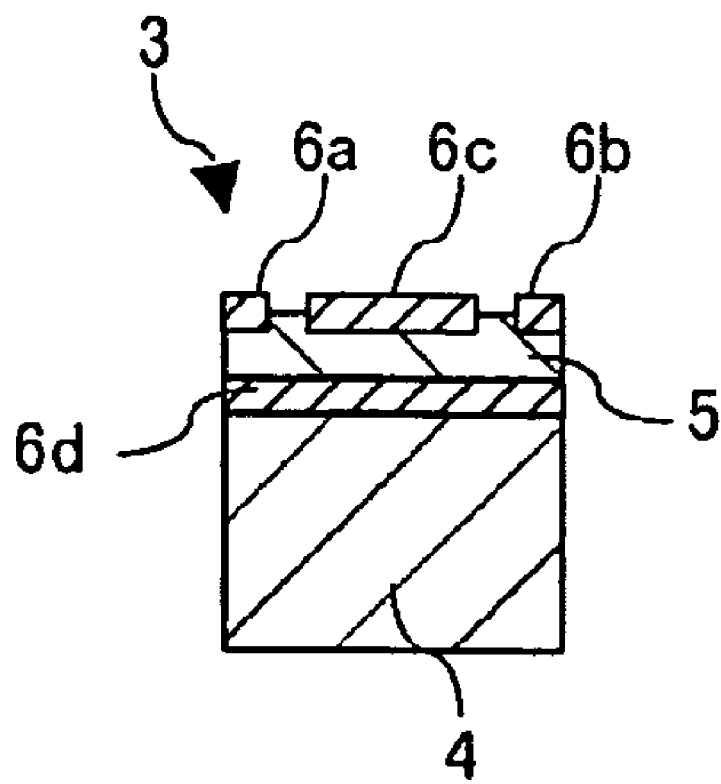
FIG. 3 is a sectional view of a vibration arm of the vibration gyro shown in FIG. 2.
Figure 3:
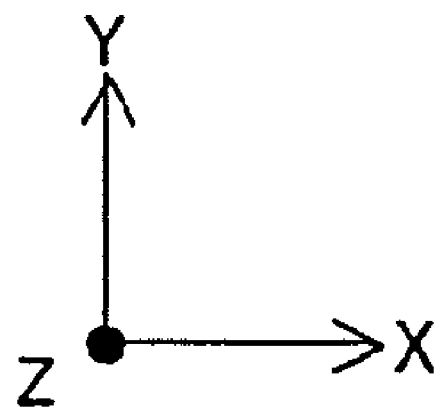

As shown in FIG. 2, the vibration gyro 1 includes a base body 2 and a vibration arm 3 extending from the base body 2. FIG. 3 is a sectional view of the vibration arm 3 taken along a plane perpendicular to a longitudinal axis (Z-axis) thereof.

The vibration gyro 1 can be produced by MEMS (Micro Electro Mechanical System). As shown in FIG. 3, for example, a conductive film as a common electrode 6d is formed on a silicon substrate 4, and a piezoelectric film 5 is formed on the conductive film. Then, a drive electrode 6c and first and second detection electrodes 6a and 6b each having a predetermined elongated shape are formed on the piezoelectric film 5 using a photolithography technique. The piezoelectric film 5, the conductive film 6d, the drive electrode 6c, and the first and second detection electrodes 6a and 6b constitute a piezoelectric element. Specifically, a first side of the piezoelectric film 5 is provided with the drive electrode 6c and the pair of first and second detection electrodes 6a and 6b, and a second side thereof opposed to the first side is provided with the common electrode 6d.

A lead electrode including lead wires 7, electrode pads 8, and bumps 9a to 9d is formed on the base body 2. The lead electrode may also be formed using a photolithography technique. The bumps 9a and 9b are respectively connected to the first and second detection electrodes 6a and 6b. Further, the bump 9c is connected to the drive electrode 6c and the bump 9d is connected to the common electrode 6d. The lead electrode is connected to a detecting circuit such as an IC via these bumps 9a to 9d. The bumps 9a to 9d are made of, for example, gold, but are not limited thereto.

After the drive electrode 6c, the first and second detection electrodes 6a and 6b, the lead wires 7, and the like are formed as described above, the vibration gyro 1 having a shape as shown in FIG. 2 is cut out from a silicon wafer.

Figure 4:
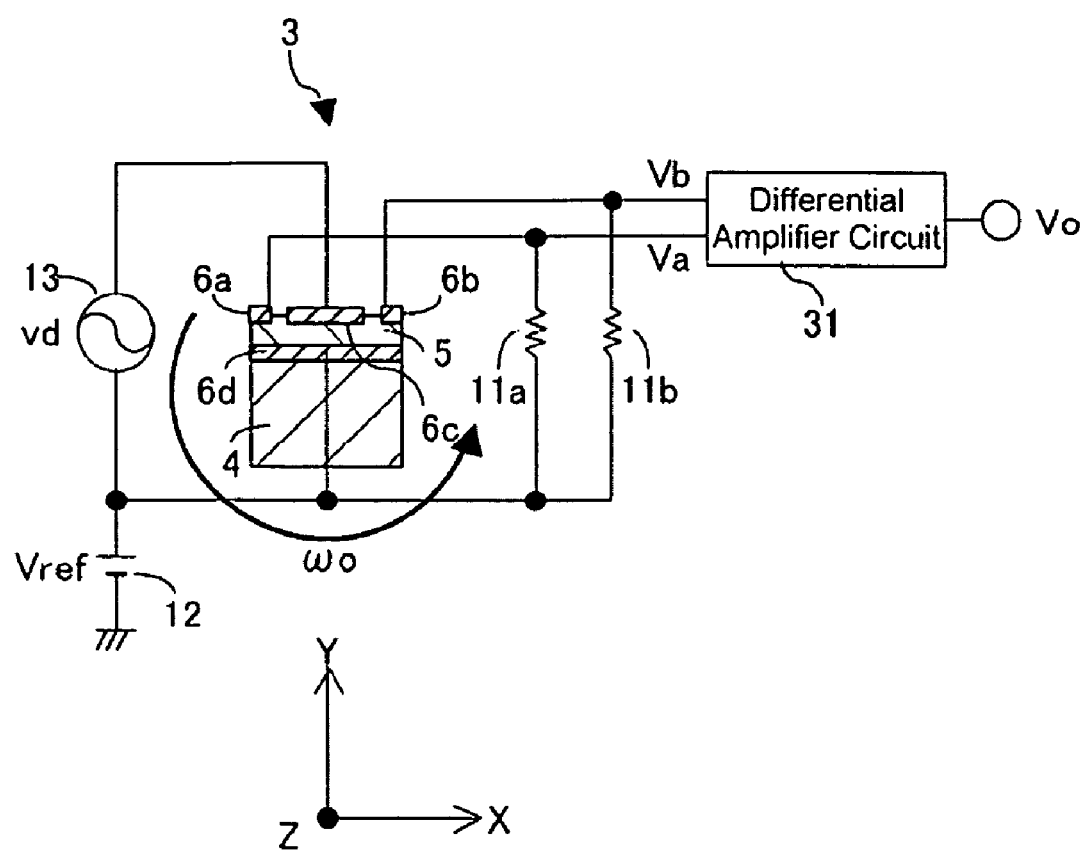
FIG. 4 is a circuit diagram for illustrating an operation principle of the vibration gyro shown in FIG. 2.

FIG. 4 is a diagram showing the operation principle of the vibration gyro 1 shown in FIG. 2.

As shown in FIG. 4, the common electrode 6d of the vibration gyro 1 is connected to the DC power supply 12. An AC power supply 13 is connected between the drive electrode 6c and the common electrode 6d. The resistor 11a is connected between the first detection electrode 6a and the common electrode 6d and the resistor 11b is connected between the second detection electrode 6b and the common electrode 6d. Further, the detection electrodes 6a and 6b are connected to the differential amplifier circuit 31.

The drive electrode 6c and the common electrode 6d are biased to a voltage value Vref by the DC power supply 12. In addition, the first and second detection electrodes 6a and 6b are biased to the voltage value Vref via the resistors 11a and 11b, respectively. In other words, a difference in DC voltage between the first side of the piezoelectric film 5 and the second side thereof opposed to the first side becomes 0. In addition, a drive voltage signal vd is input between the first side of the piezoelectric film 5 and the second side thereof opposed to the first side by the AC power supply 13 connected between the drive electrode 6c and the common electrode 6d. The drive voltage signal vd with the DC voltage value Vref as a reference is mechanically converted in the piezoelectric film 5, and a main body of the vibration arm 3 is thus caused of a flexion movement in a Y-axis direction.

The flexion movement is electrically converted in the piezoelectric film 5 to be output as AC voltage signals Va and Vb from the detection electrodes 6a and 6b, respectively. When no angular velocity ωo around the longitudinal axis (Z-axis) of the vibration arm 3 is applied, outputs of the detection electrodes 6a and 6b are signals having the same phase and magnitude. Thus, the signals are canceled in the differential amplifier circuit 31. Subsequently, when the angular velocity ωo around the longitudinal axis (Z-axis) of the vibration arm 3 is applied, a direction of the flexion movement changes due to Coriolis force generated in an X-axis direction. Accordingly, a difference is caused between the outputs of the detection electrodes 6a and 6b, which is then passed through the differential amplifier circuit 31, whereby a differential signal Vo is obtained. This is the detected signal.

Figure 5:
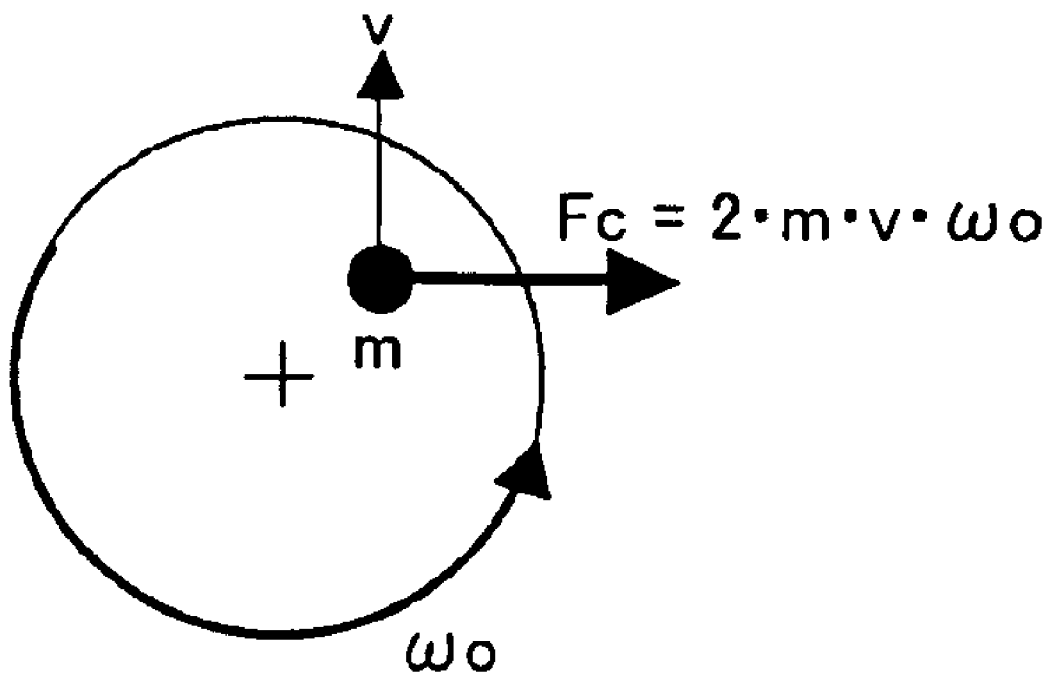
FIG. 5 is a schematic diagram showing the operation principle of FIG. 4 in terms of dynamics.

As shown in FIG. 5, assuming that a mass of the vibration arm 3 is m, a vibration velocity of the flexion movement thereof is v, and the angular velocity about the longitudinal axis of the vibration arm 3 is ωo, Coriolis force Fc can be expressed by Expression (1). It should be noted that in the following expressions, the symbol "*" represents multiplication.

$$Fc = 2*m*v*\omega o \quad (1)$$

The Coriolis force Fc is proportional to the differential signal Vo obtained in the differential amplifier circuit 31. Assuming that a proportional constant is k1, the differential signal Vo can be expressed by Expression (2).

$$Vo = k1*2*m*v*\omega o \quad (2)$$

Here, referring again to FIG. 1, description will be given on the overall operation of the gyro detection apparatus 100.

The common electrode 6d of the vibration gyro 1 is connected to the DC power supply 12. The resistor 11a is connected between the detection electrode 6a and the common electrode 6d and the resistor 11b is connected between the detection electrode 6b and the common electrode 6d. An output of the detection electrode 6a is input to the voltage follower 21a and an output of the detection electrode 6b is input to the voltage follower 21b. Outputs of the voltage followers 21a and 21b are input to the adding circuit 22 and to the differential amplifier circuit 31.

An output of the adding circuit 22 is input to the phase shifting circuits 23a and 23b and to the detecting circuit 25. An output of the phase shifting circuit 23a is input to the GCA (Gain Control Amplifier) 24. An output of the detecting circuit 25 is input to the GCA 24. An output of the GCA 24 is input to the drive electrode 6c of the vibration gyro 1. An output of the phase shifting circuit 23b is input to the synchronous detecting circuit 32.

Next, circuit operations will be described.

As already described, the drive signal as an output of the GCA 24 is an AC voltage signal biased to the DC voltage value Vref, and the drive signal is input to the drive electrode 6c of the vibration gyro 1. Moreover, the common electrode 6d is biased to the voltage value Vref by the DC power supply 12. Therefore, a difference in DC voltage between the first side of the piezoelectric film 5 and the second side thereof opposed to the first side becomes 0. The drive signal is mechanically converted in the piezoelectric film 5, and the vibration arm 3 is thus caused of a flexion movement in the Y-axis direction.

The flexion movement is electrically converted in the piezoelectric film 5 to be output as detected signals from the detection electrodes 6a and 6b. The two detected signals are AC voltage signals biased to the voltage value Vref via the resistors 11a and 11b, respectively.

The two detected signals are input to the voltage followers 21a and 21b for separating the vibration gyro 1 and the circuit in terms of impedance. After that, the detected signals are input to the adding circuit 22 and to the differential amplifier circuit 31.

The adding circuit 22 is used to cancel a change in the detected signal when an angular velocity ωo around the longitudinal axis (Z-axis) of the vibration arm 3 is applied. Specifically, when the angular velocity ωo is applied, the direction of the flexion movement changes due to the Coriolis force generated in the X-axis direction. Accordingly, an output difference is generated between the two detected signals. However, because the output difference is caused by a differential, the output after the addition does not change. On the other hand, a signal corresponding to the Coriolis force is obtained from the differential amplifier circuit 31.

The phase shifting circuit 23a is used for delaying a phase of the output by 75° from the input. Although the phase of the output of the adding circuit 22 is advanced by 75° with respect to the drive signal, the phase of the output of the phase shifting circuit 23a becomes the same phase as the drive signal. The output signal is amplified by the GCA 24 to a predetermined voltage amplitude Ad to thus be output as the drive signal. The GCA 24 controls an amplification degree by feeding back the output of the adding circuit 22 so that the output has a constant voltage amplitude after the voltage amplitude of the output of the adding circuit 22 is detected by the detecting circuit 25.

Further, when the angular velocity ωo is applied, an AC signal corresponding to Coriolis force is obtained from the differential amplifier circuit 31. By performing synchronous detection at an output timing at which the signal is delayed by 90° by the phase shifting circuit 23b, a signal corresponding to Coriolis force, from which AC components haven been removed, can be obtained as the output of the synchronous detecting circuit 32.

This is because, regarding the timing of the synchronous detection, a maximum level of sensitivity can be obtained when performing the synchronous detection at a phase delayed by 90° with respect to the AC signals as outputs from the detection electrodes 6a and 6b.

A characteristic curve of the input/output characteristics of the vibration gyro 1 at a frequency lower than a resonance frequency fo is more affected by a leak voltage that flows through the parasitic capacitances between the drive electrode and the detection electrodes of the vibration gyro 1. Thus, by setting the phase shifting circuit 23a such that the input/output phase difference of the vibration gyro 1 becomes smaller than 90°, it is possible to cause self-oscillation at a frequency at which the vibration gyro 1 is not affected by the leak voltage. In other words, stabilization of self-oscillation suppresses noises and realizes a high S/N.

The phase amount to be delayed by the phase shifting circuit 23a is desirably within the range larger than 45° and smaller than 90°. With the delay phase amount of 45° or less, self-oscillation becomes difficult.

Here, more detailed description will be given on the reason why the phase shifting circuit 23a is provided in addition to the phase shifting circuit 23b to delay the output phase by 75° with respect to the input.

Figure 6:
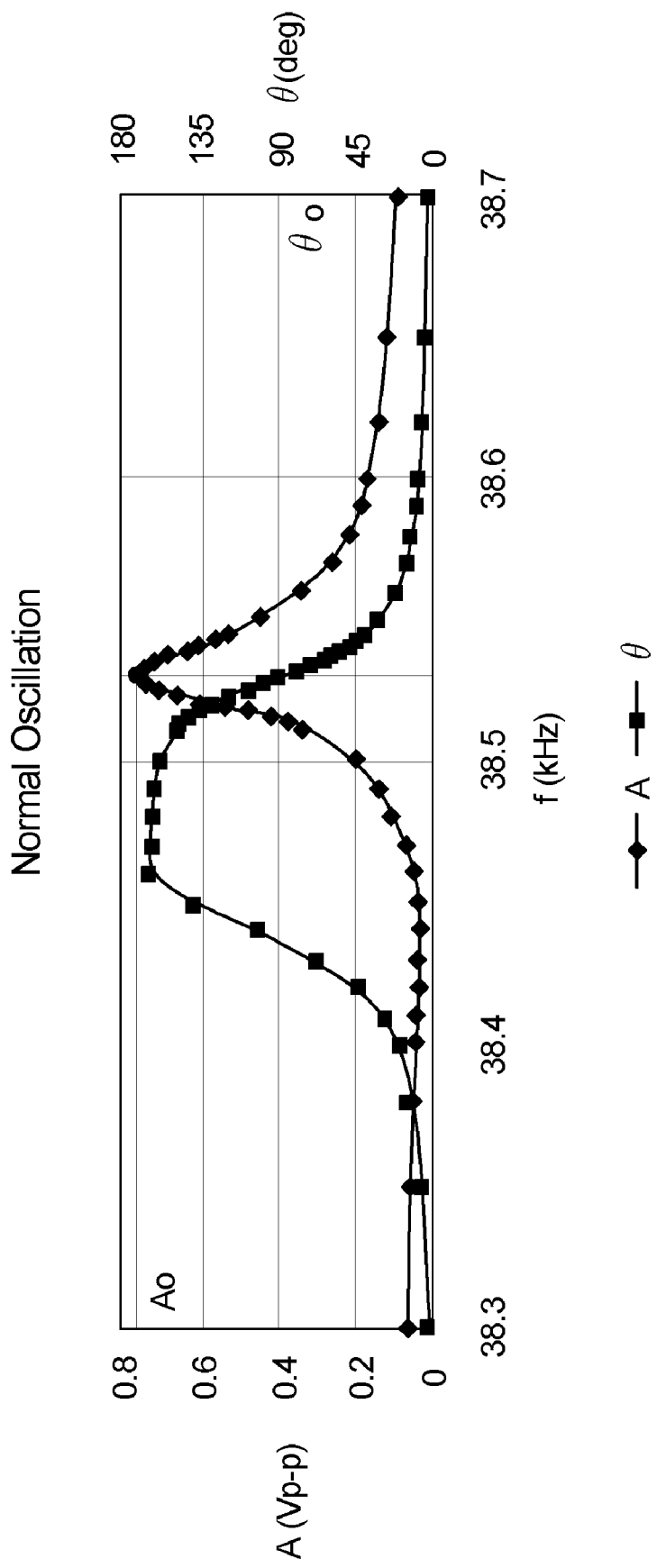
FIG. 6 is a graph showing ideal input/output characteristics of the vibration gyro shown in FIG. 2.

FIG. 6 is a graph showing ideal input/output characteristics of the vibration gyro 1 shown in FIG. 4.

The voltage amplitude Ad of the drive signal vd as an input of the vibration gyro 1 is fixed to 1.1 Vp-p, and an output Va of the detection electrode 6a or an output Vb of the detection electrode 6b was measured. An abscissa axis represents a resonance frequency f of the drive signal vd and ordinate axes respectively represent a voltage amplitude A of the output Va or Vb and a phase θ of the output Va or Vb. The vibration gyro 1 is used at a frequency fo at which highest input/output efficiency is obtained and at which the voltage amplitude becomes Ao as maximum. The voltage amplitude becomes about 0.75 Vp-p at the frequency fo, and the phase is about 90°.

Figure 7:
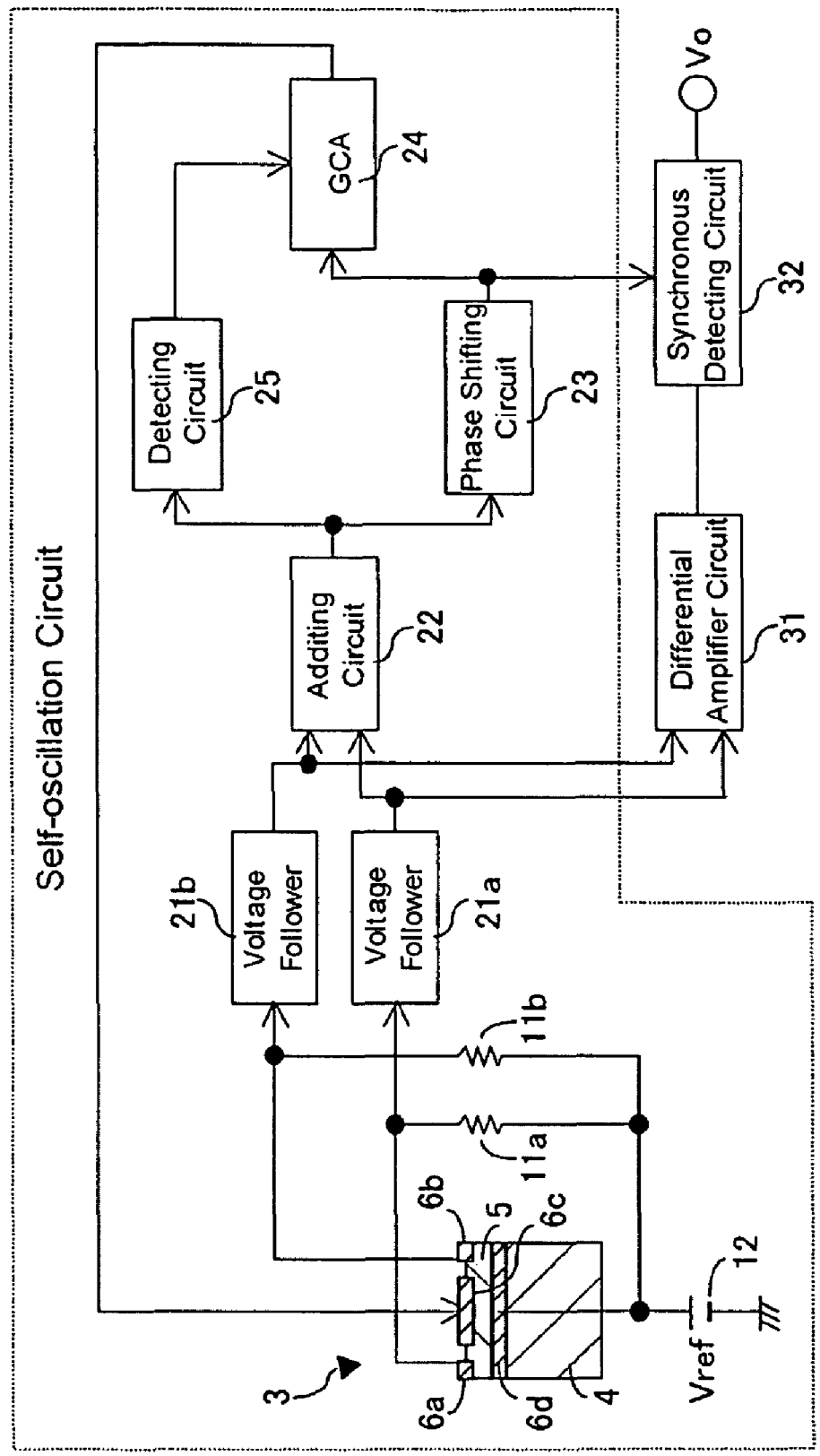
FIG. 7 is a circuit block diagram showing a structure of a gyro detection apparatus as a comparative example.

Hypothetically, assuming that the input/output characteristics of the vibration gyro 1 are as shown in FIG. 6, the gyro detection apparatus can be structured as shown in FIG. 7. Specifically, an output of a single phase shifting circuit 23 can be made an input to both the GCA 24 and the synchronous detecting circuit 32.

Figure 8:
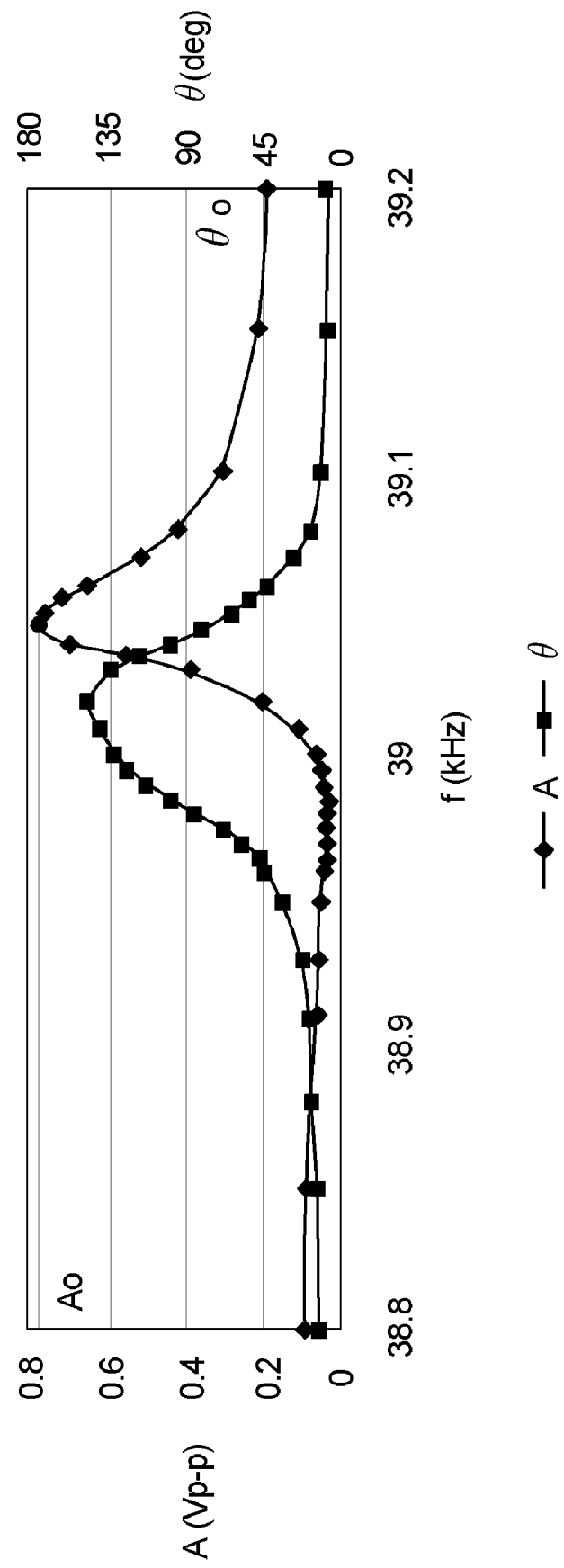
FIG. 8 is a graph showing actual input/output characteristics of the vibration gyro shown in FIG. 2.

However, actual input/output characteristics of the vibration gyro 1 are as shown in FIG. 8.

Specifically, as shown in FIG. 8, assuming that, in terms of the actual input/output characteristics of the vibration gyro 1, the vibration gyro 1 is used at the frequency fo at which highest input/output efficiency is obtained and at which the voltage amplitude becomes Ao as maximum, the voltage amplitude becomes about 0.75 Vp-p at the frequency fo, and the phase is about 75°.

When the vibration gyro 1 is operated in the circuit shown in FIG. 7, the self-oscillation circuit 110 does not function normally, and abnormal oscillation is observed. The abnormal oscillation refers to double oscillation including oscillation at the frequency fo and oscillation at a frequency around 300 Hz.

Next, description will be given on the reasons why the vibration gyro 1 is varied this much and why the vibration gyro 1 ended up with the characteristics shown in FIG. 8.

Figure 9:
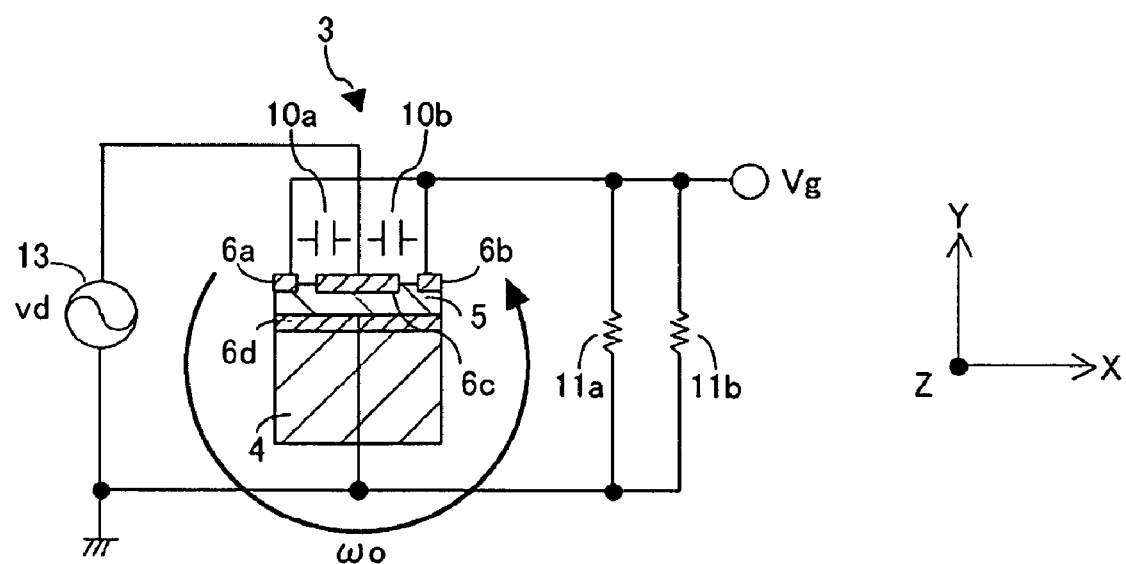
FIG. 9 is a diagram for illustrating a cause of the input/output characteristics shown in FIG. 8.

FIG. 9 is a circuit diagram for illustrating the input/output characteristics of the vibration gyro 1.

The common electrode 6d of the vibration gyro 1 is grounded. The AC power supply 13 is connected between the drive electrode 6c and the common electrode 6d. The detection electrodes 6a and 6b are electrically short-circuited since the purpose is only to measure the input/output characteristics. Further, the resistors 11a and 11b are connected between the detection electrodes 6a 6b and the common electrode 6d, respectively.

The drive electrode 6c and the common electrode 6d are biased to a voltage value 0. Further, the first and second detection electrodes 6a and 6b are biased to the voltage value 0 via the resistors 11a and 11b, respectively. In other words, the difference in DC voltage between the first side of the piezoelectric film 5 and the second side thereof opposed to the first side becomes 0. In addition, a drive voltage signal vd is input between the first side of the piezoelectric film 5 and the second side thereof opposed to the first side by the AC power supply 13 connected between the drive electrode 6c and the common electrode 6d. The drive voltage signal vd with the DC voltage value 0 as a reference is mechanically converted in the piezoelectric film 5, and the main body of the vibration arm 3 is thus caused of a flexion movement in the Y-axis direction.

The flexion movement is electrically converted in the piezoelectric film 5 to be output as AC voltage signals from the detection electrodes 6a and 6b. The inventors of the present invention have found that in addition to the system described above, there is a route for determining the input/output characteristics of the vibration gyro 1. This is due to a parasitic capacitance 10a between the drive electrode 6c and the detection electrode 6a and a parasitic capacitance 10b between the drive electrode 6c and the detection electrode 6b. In other words, the route is a route through which the drive voltage signal vd input between the drive electrode 6c and the common electrode 6d passes the parasitic capacitances 10a and 10b to be output as AC voltage signals from the detection electrodes 6a and 6b. A signal obtained by adding the above-mentioned two outputs (outputs obtained by the flexion movement and parasitic capacitances) is an AC voltage signal Vg (see FIG. 9).

Figure 10:
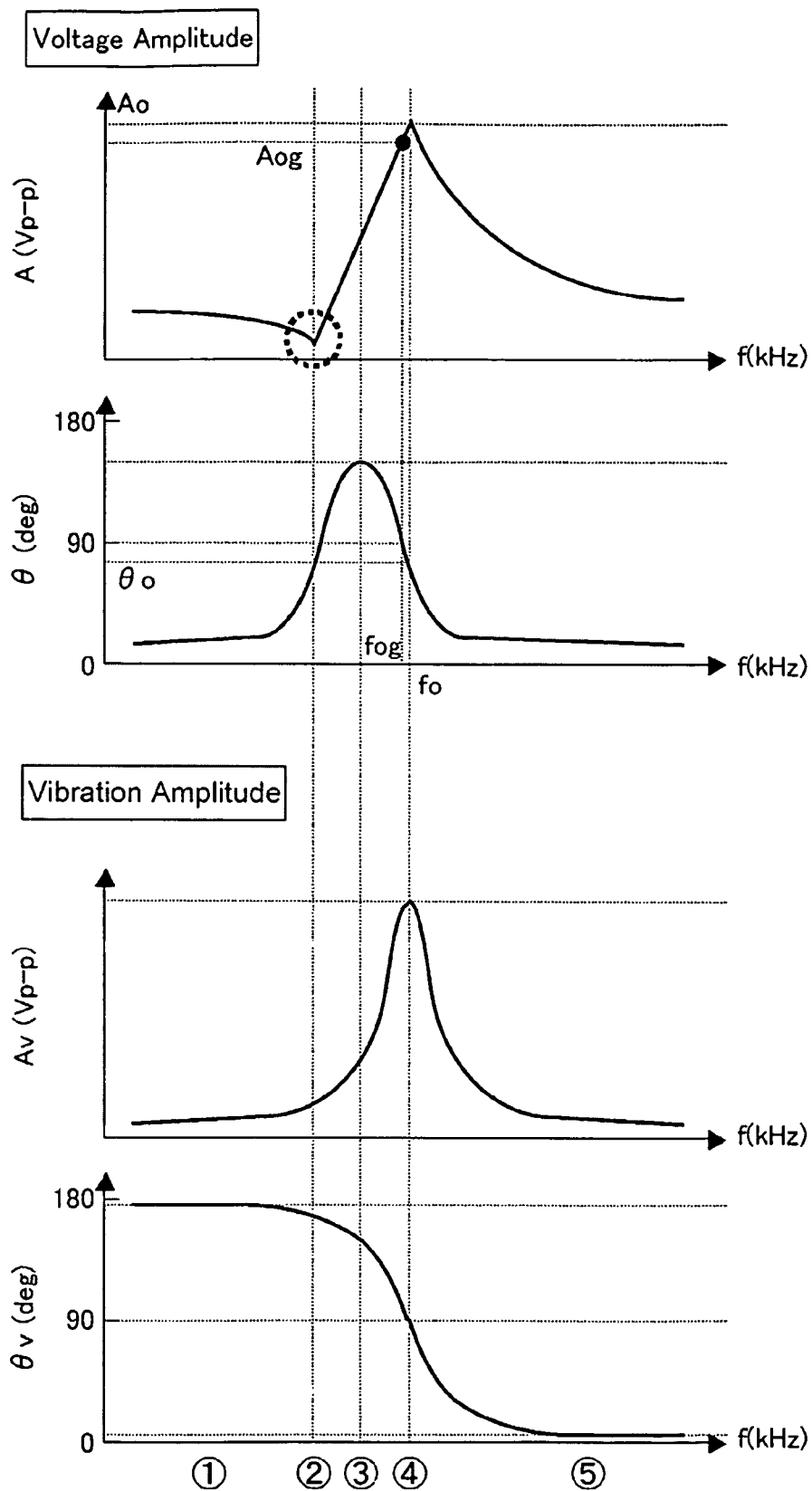
FIG. 10 shows diagrams (1) for illustrating more specifically the cause of the input/output characteristics shown in FIG. 8.
Figure 11:
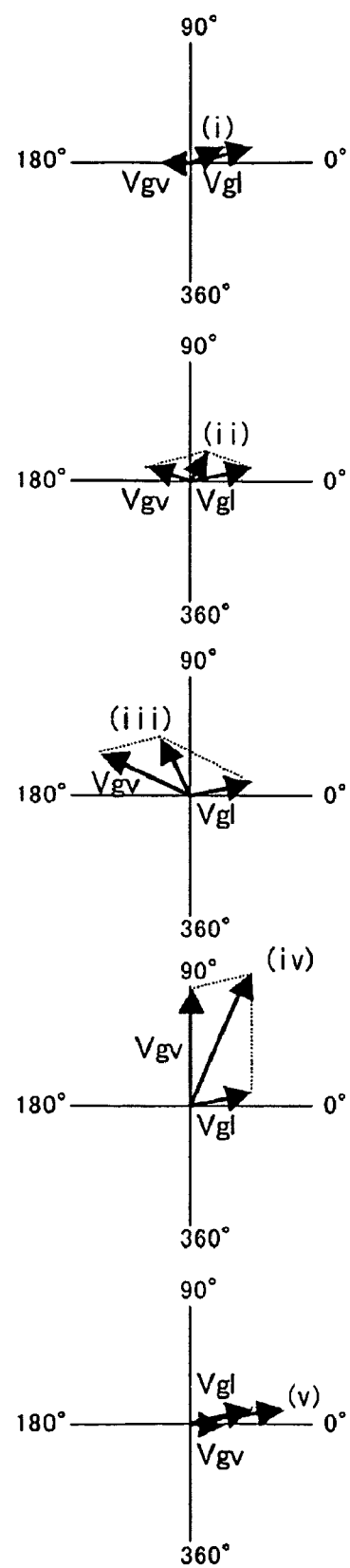
FIG. 11 shows diagrams (2) for illustrating more specifically the cause of the input/output characteristics shown in FIG. 8.

FIGS. 10 and 11 are diagrams for illustrating a mechanism for determining the input/output characteristics of the vibration gyro 1.

Regarding the voltage amplitude, the graphs schematically show the input/output characteristics of the vibration gyro 1 shown in FIG. 8, and the voltage amplitude is obtained by fixing the voltage amplitude Ad of the drive signal vd as an input of the vibration gyro 1 shown in FIG. 9 at a constant value and measuring the output Vg of the detection electrodes 6a and 6b. Each of the abscissa axes represents the resonance frequency f of the drive signal vd and the ordinate axes respectively represent the voltage amplitude A of the output Vg and the voltage phase θ of the output Vg.

The vibration amplitude is obtained by measuring an amplitude of mechanical vibration at a tip portion of the vibration arm 3, which corresponds to the voltage amplitude. Each of the abscissa axes represents the resonance frequency f of the drive signal vd and the ordinate axes respectively represent the vibration amplitude Av and the vibration phase θv at the tip portion of the vibration arm 3.

The drive signal vd is mechanically converted in the piezoelectric film 5, and the main body of the vibration arm 3 is thus caused of a flexion movement in the Y-axis direction. The vibration amplitude Av caused by the flexion movement becomes maximum at the resonance frequency fo determined based on the shape of the vibration gyro 1, and the vibration phase θv advances 90° with respect to the drive signal vd. The vibration amplitude Av becomes small and the vibration phase θv advances 180° at a frequency lower than the resonance frequency fo. The vibration amplitude Av becomes small and the vibration phase θv becomes 0° at a frequency higher than the resonance frequency fo.

Such a flexion movement is electrically converted in the piezoelectric film 5 to be output, but a leak voltage that flows through the parasitic capacitances 10a and 10b is also output together therewith. It is assumed that the output obtained by the flexion movement is Vgv, and the output obtained by the leak voltage is Vg1. The output Vg1 obtained by the leak voltage has a constant amplitude irrespective of the frequency, and the phase delay/advance is as small as about 0° with respect to the drive signal vd.

Next, the input/output characteristics of the vibration gyro 1 will be described based on a relationship between the output Vgv obtained by the flexion movement and the output Vg1 obtained by the leak voltage.

The outputs Vgv and Vg1 at respective frequency regions 1 to 5 are represented in vectors, and addition of the vectors results in the input/output characteristics. The vectors are represented in voltage amplitude and voltage phase.

(1) In the frequency region 1, the amplitude is Vgv<Vg1, and the phase of Vgv is around 180°. The output Vg obtained by the addition has a small amplitude and the phase thereof is around 0°.

(2) In the frequency region 2, the amplitude is Vgv<Vg1, and the phase of Vgv is around 180°. The output Vg obtained by the addition has a minimum amplitude and the phase thereof is around 75°.

(3) In the frequency region 3, the amplitude is Vgv>Vg1, and the phase of Vgv is 90° to 180°. The output Vg obtained by the addition has a mediate amplitude and the phase thereof is about 90° to 180°.

(4) In the frequency region 4, the amplitude is Vgv>Vg1, and the phase of Vgv is 90°. The output Vg obtained by the addition has a maximum amplitude and the phase thereof is around 75°.

(5) In the frequency region 5, the amplitude is Vgv<Vg1, and the phase of Vgv is around 0°. The output Vg obtained by the addition has a mediate amplitude and the phase thereof is around 0°.

The frequency region 2 seems like an antiresonance point since the amplitude of the output Vg becomes minimum and the phase thereof becomes almost the same as the resonance frequency fo. However, from the above description, it can be seen that the frequency region 2 is a point generated due to the leak voltage. Without the leak voltage, the input/output characteristics of the vibration gyro 1 will show a characteristic curve similar to that of the vibration amplitude and vibration phase.

When the vibration gyro 1 is caused to self-oscillate in the circuit shown in FIG. 7, the phase is delayed by 90° at the phase shifting circuit 23, which means that in terms of the input/output characteristics of the vibration gyro 1, the vibration gyro 1 is operated at the voltage phase θ of 90°. At this time, the frequency f is fog, which is smaller than the actual resonance frequency fo. Further, the voltage amplitude A is Aog at operation, which is smaller than the amplitude Ao in the case of no leak voltage.

The leak voltage can be seen to greatly affect the characteristic curve of the input/output characteristics of the vibration gyro 1 at a frequency lower than the resonance frequency fo. Due to this effect, operation of the vibration gyro 1 at a frequency lower than the resonance frequency fo causes an erroneous operation of the self-oscillation circuit, leading to double oscillation.

Thus, in the gyro detection apparatus 100 of this embodiment, the phase shifting circuit 23a is provided in addition to the phase shifting circuit 23b to delay the output phase by 75° with respect to the input. Accordingly, it becomes possible to cause self-oscillation at a frequency at which the input/output characteristics are not affected by the leak voltage. In other words, the stabilization of the self-oscillation suppresses noises and realizes a high S/N.

The present invention is not limited to the embodiment described above, and various modifications may be made.

For example, a single vibration arm is provided to the vibration gyro 1 in the above embodiment. However, a vibration gyro with three vibration arms may be used, for example.

Figure 12:
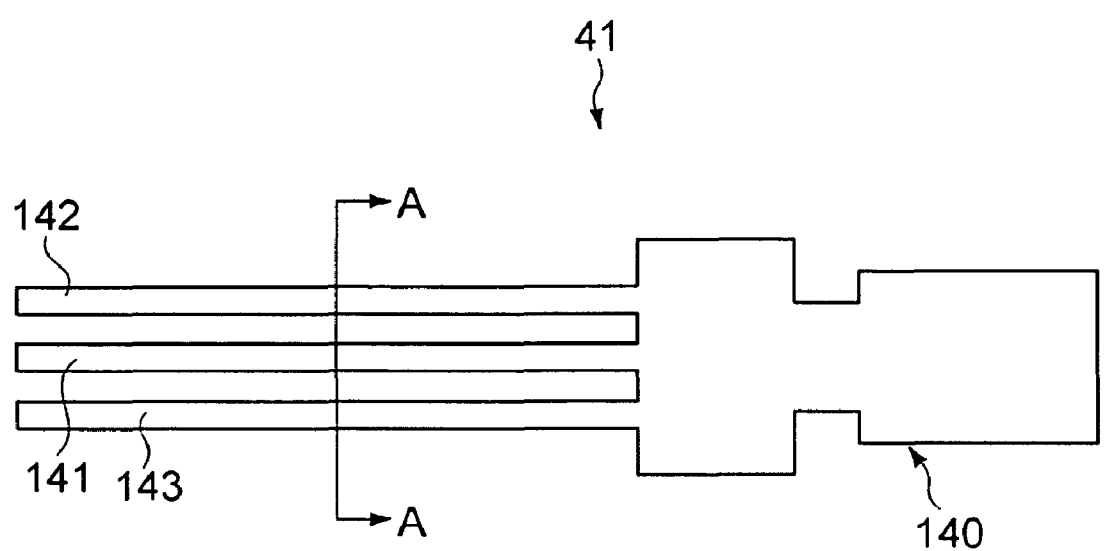
FIG. 12 is a plan view showing a structure of the vibration gyro according to another embodiment.
Figure 13:
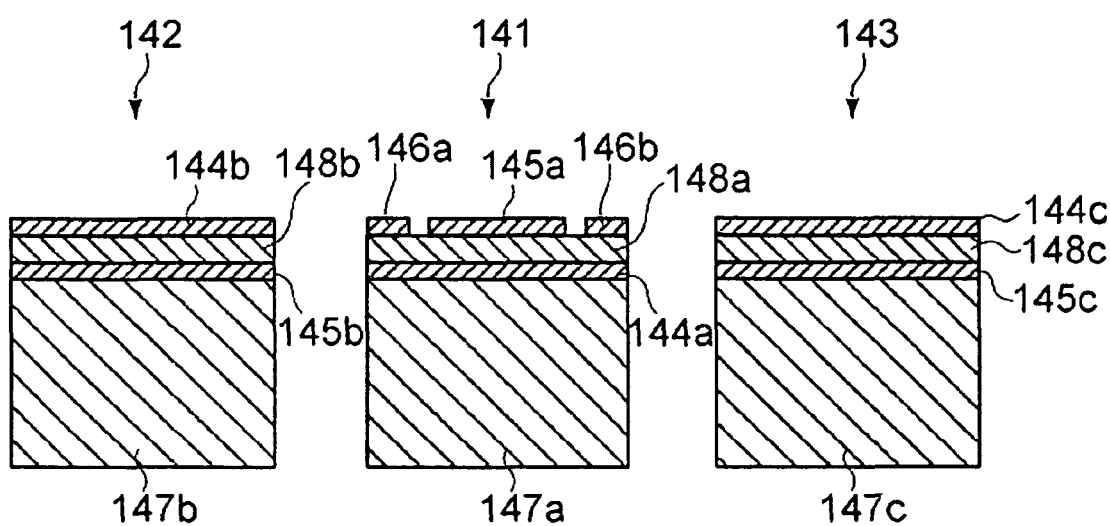
FIG. 13 is a sectional view of the vibration gyro shown in FIG. 12.

FIG. 12 is a schematic diagram showing a vibration element according to another embodiment. FIG. 13 is a sectional diagram taken along the line A-A of FIG. 12.

A vibration element 41 includes a base body 140 and three vibration arms 141 to 143 provided so as to extend from the base body 140. The vibration element 41 can also be produced by MEMS, for example. As shown in FIG. 13, the three vibration arms 141 to 143 respectively include base arms 147a to 147c made of silicon.

A piezoelectric film 148a is formed on the base arm 147a of the vibration arm 141 in the middle, and a first drive electrode 145a and first and second detection electrodes 146a and 146b are provided on a first side of the piezoelectric film 148a. In addition, a common electrode 144a is provided on a second side of the piezoelectric film 148a opposed to the first side.

A piezoelectric film 148b is formed on the base arm 147b of the vibration arm 142, and a common electrode 144b is provided on the first side of the piezoelectric film 148b. In addition, a second drive electrode 145b is provided on the second side of the piezoelectric film 148b. Similarly, a piezoelectric film 148c is formed on the base arm 147c of the vibration arm 143, and a common electrode 144c is provided on the first side of the piezoelectric film 148c. Further, a third drive electrode 145c is provided on the second side of the piezoelectric film 148c.

The circuit may be structured such that a signal input to the common electrode 144a corresponding to the common electrode 6d shown in FIG. 1 is input to the common electrodes 144b and 144c, and a signal input to the drive electrode 145a corresponding to the drive electrode 6c shown in FIG. 1 is input to the second and third drive electrodes 145b and 145c.

The vibration gyro structured as described above is driven so that the vibration arms 142 and 143 on both sides vibrate at the same phase and with the same amplitude and the vibration arm 141 in the middle vibrates at an inverse phase and with twice the amplitude as the vibration arms 142 and 143 on both sides. Focusing on the vibration arm 141 in the middle, because the vibration arm 141 has a structure similar to that in the embodiment shown in FIGS. 2 and 3, detection sensitivity of the first and second detection electrodes 146a and 146b can be improved without an increase in power supply voltage, and a high S/N can therefore be realized.

Note that the second and third drive electrodes 145b and 145c do not always have to be input with a drive signal. In this case, the vibration arms 142 and 143 on both sides vibrate by a rebound caused by the vibration of the vibration arm 141 in the middle.

Figure 14:
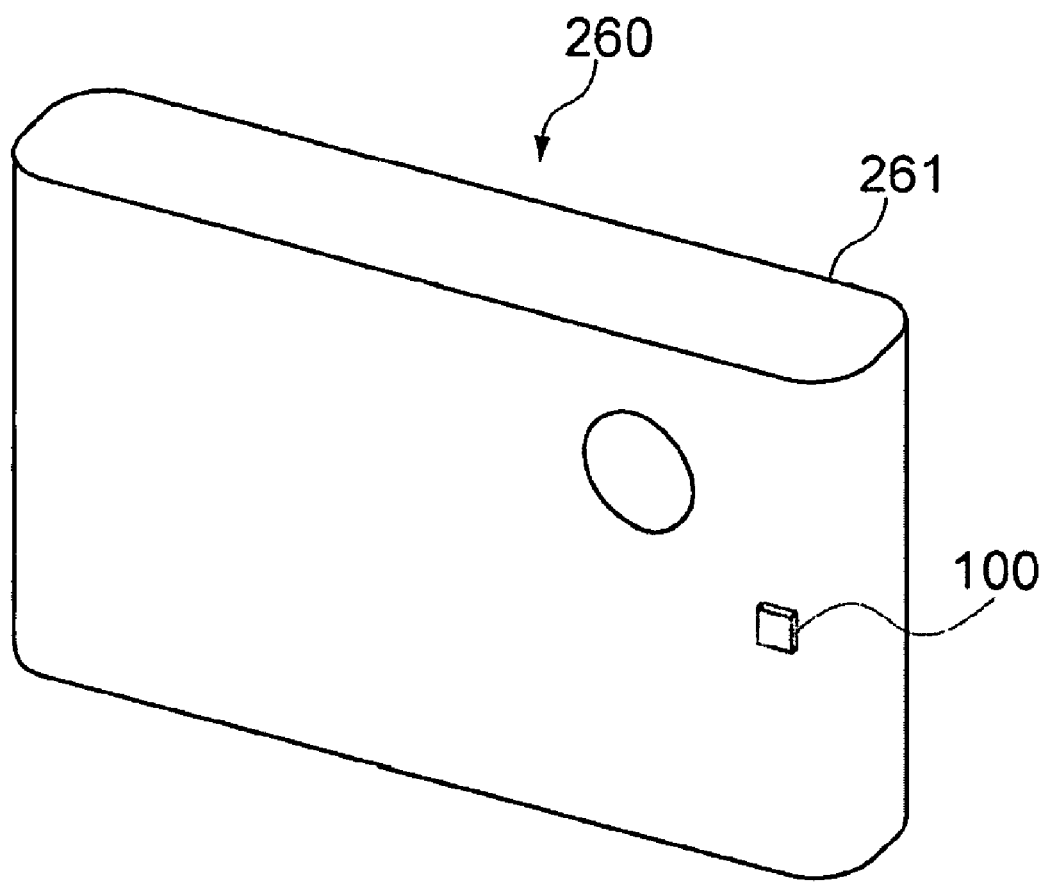
FIG. 14 is a schematic perspective view showing a digital camera as an example of an electronic apparatus equipped with a gyro detection apparatus.
Figure 15:
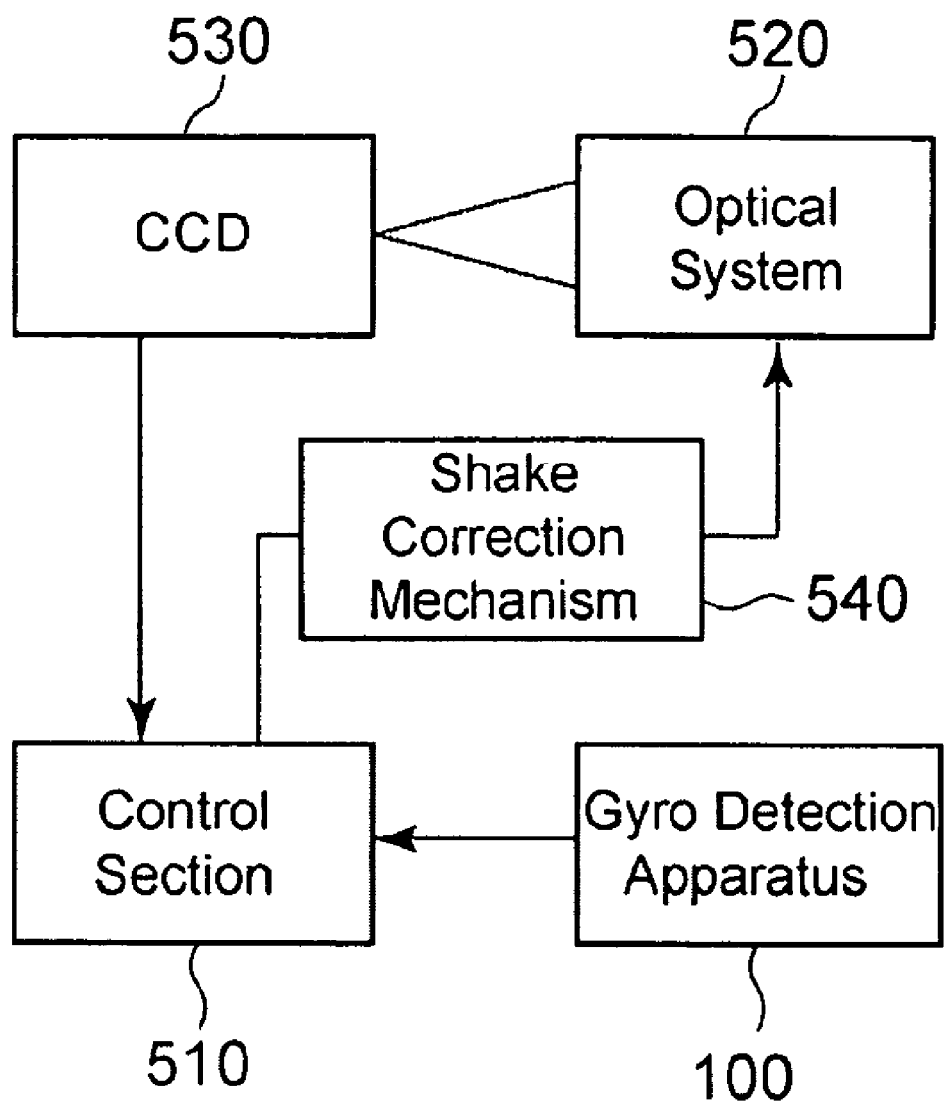
FIG. 15 is a block diagram showing a structure of the digital camera.

FIG. 14 is a schematic perspective view of a digital camera as an example of an electronic apparatus mounted with the gyro detection apparatus. FIG. 15 is a block diagram showing a structure of the digital camera.

A digital camera 260 has an apparatus main body 261 to which the gyro detection apparatus 100 is mounted. The apparatus main body 261 is a frame or a casing made of, for example, metal or a resin. The gyro detection apparatus 100 is packaged in a size of, for example, a several mm square. For detecting angular velocities about at least to two axes, at least two gyro detection apparatuses 100 are mounted.

As shown in FIG. 15, the digital camera 260 includes the gyro detection apparatus 100, a control section 510, an optical system 520 equipped with a lens and the like, a CCD 530, and a shake correction mechanism 540 for executing shake correction with respect to the optical system 520.

Coriolis force of the two axes is detected by the two gyro detection apparatuses 100. The control section 510 uses the shake correction mechanism 540 to perform the shake correction in the optical system 520 based on the detected Coriolis force.

The electronic apparatus mounted with the gyro detection apparatus according to the embodiments of the present invention is not limited to the digital camera. Examples of the electronic apparatus include a laptop computer, PDA (Personal Digital Assistance), electronic dictionary, audio/visual device, projector, cellular phone, game instrument, car navigation device, robot device, and other electrical appliances.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A detection apparatus, comprising:
a cantilever vibration gyro including a piezoelectric element which has a first side and a second side, the first side provided with a drive electrode and a pair of detection electrodes, the pair of detection electrodes consisting of a first detection electrode and a second detection electrode, the drive electrode disposed between the pair of detection electrodes with predetermined gaps, the second side opposed to the first side and provided with a common electrode, the cantilever vibration gyro vibrating by a drive signal input between the drive electrode and the common electrode and generating a first detected signal from the first detection electrode and a second detected signal from the second detection electrode corresponding to Coriolis force from the pair of detection electrodes;
bias applying means for applying a bias voltage to the pair of detection electrodes;
adding means for adding the first detected signal and the second detected signal to produce an added signal;
first phase delaying means for delaying a phase of the added signal by a range larger than 45° and smaller than 90°;
amplitude controlling means for controlling the added signal delayed by the first phase delaying means to a predetermined voltage amplitude and outputting the added signal delayed by the first phase delaying means and amplitude controlling means as the drive signal; and
second phase delaying means for delaying a phase of the added signal by a second phase amount of 90°.

2. The detection apparatus according to claim 1, wherein the vibration gyro is caused to self-oscillate at a frequency higher than a resonance frequency of the vibration gyro.

3. A detection apparatus, comprising:
a cantilever vibration gyro including a piezoelectric element which has a first side and a second side, the first side provided with a drive electrode and a pair of detection electrodes, the pair of detection electrodes consisting of a first detection electrode and a second detection electrode, the drive electrode disposed between the pair of detection electrodes with predetermined gaps, the second side opposed to the first side and provided with a common electrode, the cantilever vibration gyro vibrating by a drive signal input between the drive electrode and the common electrode and generating a first detected signal from the first detection electrode and a second detected signal from the second detection electrode corresponding to Coriolis force from the pair of detection electrodes;
bias applying means for applying a bias voltage to the pair of detection electrodes;
adding means for adding the first detected signal and the second detected signal to produce an added signal;
a first phase delaying means for delaying a phase of the added signal by a first phase amount;
amplitude controlling means for controlling the added signal delayed by the first phase delaying means to a predetermined voltage amplitude and outputting the added signal delayed by the first phase delaying means and amplitude controlling means as the drive signal;
differential amplifier means for differential-amplifying the first detected signal and the second detected signal;
a second phase delaying means for delaying the phase of the added signal by a second phase amount different from the first phase amount such that the added signal delayed by the second phase delaying means has maximum amplitude; and
synchronous detecting means for synchronously detecting the signal differential-amplified by the differential amplifier means based on the added signal delayed by the second phase delaying means.

4. The detection apparatus according to claim 3, wherein the vibration gyro is caused to self-oscillate at a frequency higher than a resonance frequency of the vibration gyro.

5. A method of detecting an angular velocity using a cantilever vibration gyro including a piezoelectric element which has a first side and a second side, the first side provided with a drive electrode and a pair of detection electrodes, the pair of detection electrodes consisting of a first detection electrode and a second detection electrode, the drive electrode disposed between the pair of detection electrodes with predetermined gaps, the second side opposed to the first side and provided with a common electrode, the cantilever vibration gyro vibrating by a drive signal input between the drive electrode and the common electrode and generating a first detected signal from the first detection electrode and a second detected signal from the second detection electrode corresponding to Coriolis force from the pair of detection electrodes, the method comprising:

applying a bias voltage to the pair of detection electrodes;
adding the first detected signal with the second detected signal, producing an added signal;
delaying a phase of the added signal by a range larger than 45° and smaller than 90°, resulting in a first delayed signal;
controlling the first delayed signal to a predetermined voltage amplitude and outputting the first delayed signal controlled by the predetermined voltage amplitude as the drive signal; and
delaying a phase of the added signal by 75°, resulting in a second delayed signal.

6. The detection method according to claim 5, wherein the vibration gyro is caused to self-oscillate at a frequency higher than a resonance frequency of the vibration gyro.

7. A method of detecting an angular velocity using a cantilever vibration gyro including a piezoelectric element which has a first side and a second side, the first side provided with a drive electrode and a pair of detection electrodes, the pair of detection electrodes consisting of a first detection electrode and a second detection electrode, the drive electrode disposed between the pair of detection electrodes with predetermined gaps, the second side opposed to the first side and provided with a common electrode, the cantilever vibration gyro vibrating by a drive signal input between the drive electrode and the common electrode and generating a first detected signal from the first detection electrode and a second detected signal from the second detection electrode corresponding to Coriolis force from the pair of detection electrodes, the method comprising:

applying a bias voltage to the pair of detection electrodes;
adding the first detected signal with the second detected signal, producing an added signal;
delaying a phase of the added signal by a first phase amount;
controlling the added signal delayed by the first phase amount to a predetermined voltage amplitude and outputting the added signal delayed by the first phase amount and controlled by a predetermined voltage amplitude as the drive signal;
differential-amplifying the first detected signal and the second detected signal;
delaying the phase of the added signal by a second phase amount different from the first phase amount such that the added signal delayed by the second phase amount has maximum amplitude; and
synchronously detecting the differential-amplified signal based on the added signal delayed by the second phase amount.

8. The detection method according to claim 7, wherein the vibration gyro is caused to self-oscillate at a frequency higher than a resonance frequency of the vibration gyro.

9. An electronic apparatus, comprising:
a detection apparatus including
a cantilever vibration gyro including a piezoelectric element which has a first side and a second side, the first side provided with a drive electrode and a pair of detection electrodes, the pair of detection electrodes consisting of a first detection electrode and a second detection electrode, the drive electrode disposed between the pair of detection electrodes with predetermined gaps, the second side opposed to the first side and provided with a common electrode, the cantilever vibration gyro vibrating by a drive signal input between the drive electrode and the common electrode and generating a first detected signal from the first detection electrode and a second detected signal from the second detection electrode corresponding to Coriolis force from the pair of detection electrodes,
bias applying means for applying a bias voltage to the pair of detection electrodes,
adding means for adding the first detected signal and the second detected signal to produce an added signal,
a first phase delaying means for delaying a phase of the added signal by a first phase amount,
amplitude controlling means for controlling the added signal delayed by the first phase delaying means to a predetermined voltage amplitude and outputting the added signal delayed by the first phase delaying means and amplitude controlling means as the drive signal,
differential amplifier means for differential-amplifying the first detected signal and the second detected signal,
a second phase delaying means for delaying the phase of the added signal by a second phase amount different from the first phase amount such that the added signal delayed by the second phase amount has maximum amplitude,
synchronous detecting means for synchronously detecting the signal differential-amplified by the differential amplifier means based on the added signal delayed by the second phase delaying means; and
controlling means for performing predetermined control based on an output of the synchronous detecting means.

10. The electronic apparatus according to claim 9, wherein the electronic apparatus is a digital camera equipped with a shake correction mechanism, and
wherein the controlling means controls a correction amount of the shake correction mechanism.

* * * * *